Nov. 10, 1936.　　　　J. O'SHEA ET AL　　　2,060,341
DISPLAY DEVICE
Filed Feb. 4, 1935　　　4 Sheets-Sheet 1
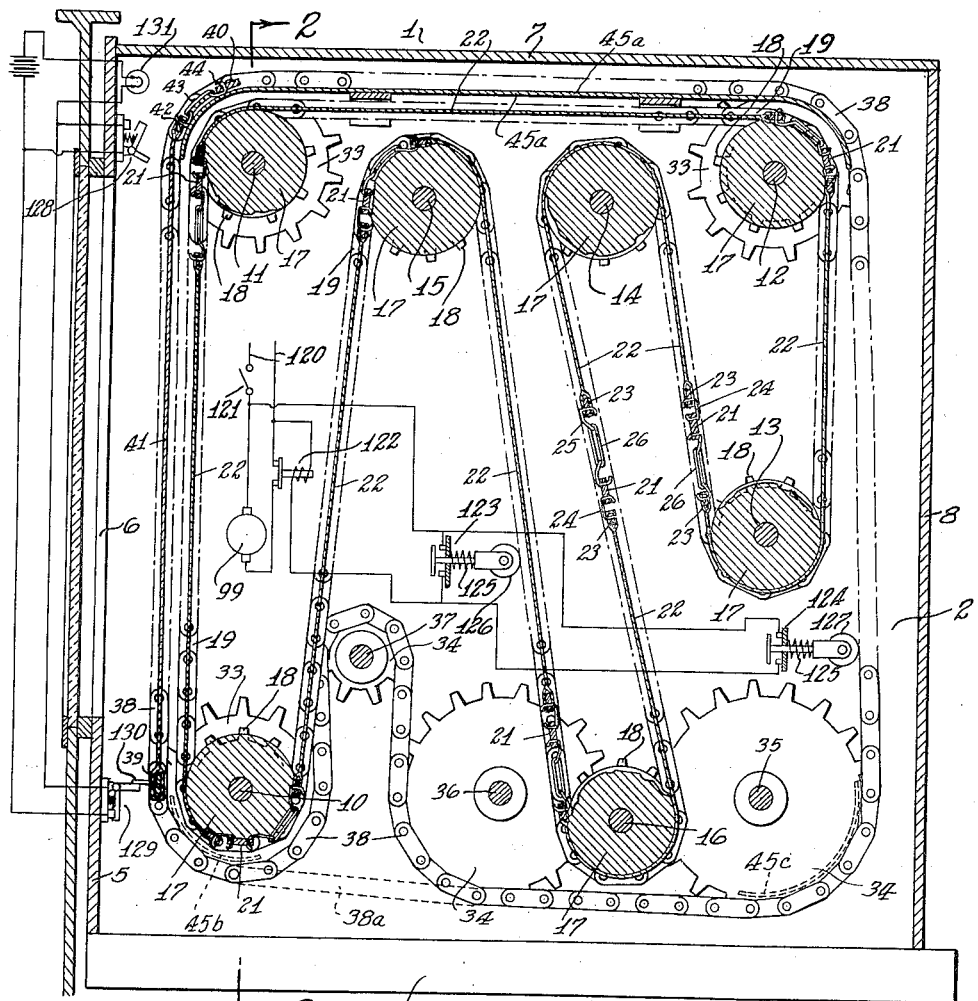
Fig.1.
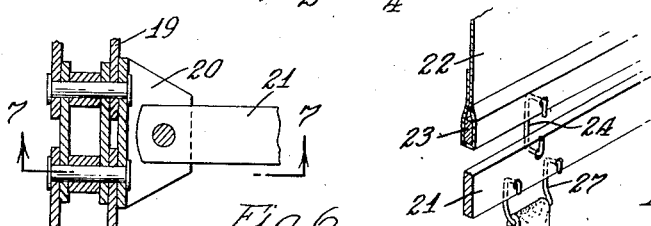
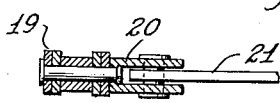
Fig.6.
Fig.7.
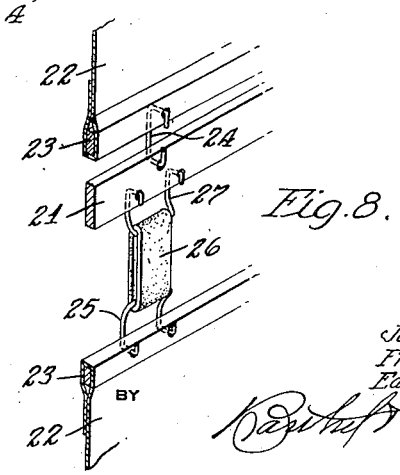
Fig.8.
INVENTORS
James O'Shea
Frederick N. Ross
Earl M. Crosby
BY
ATTORNEYS

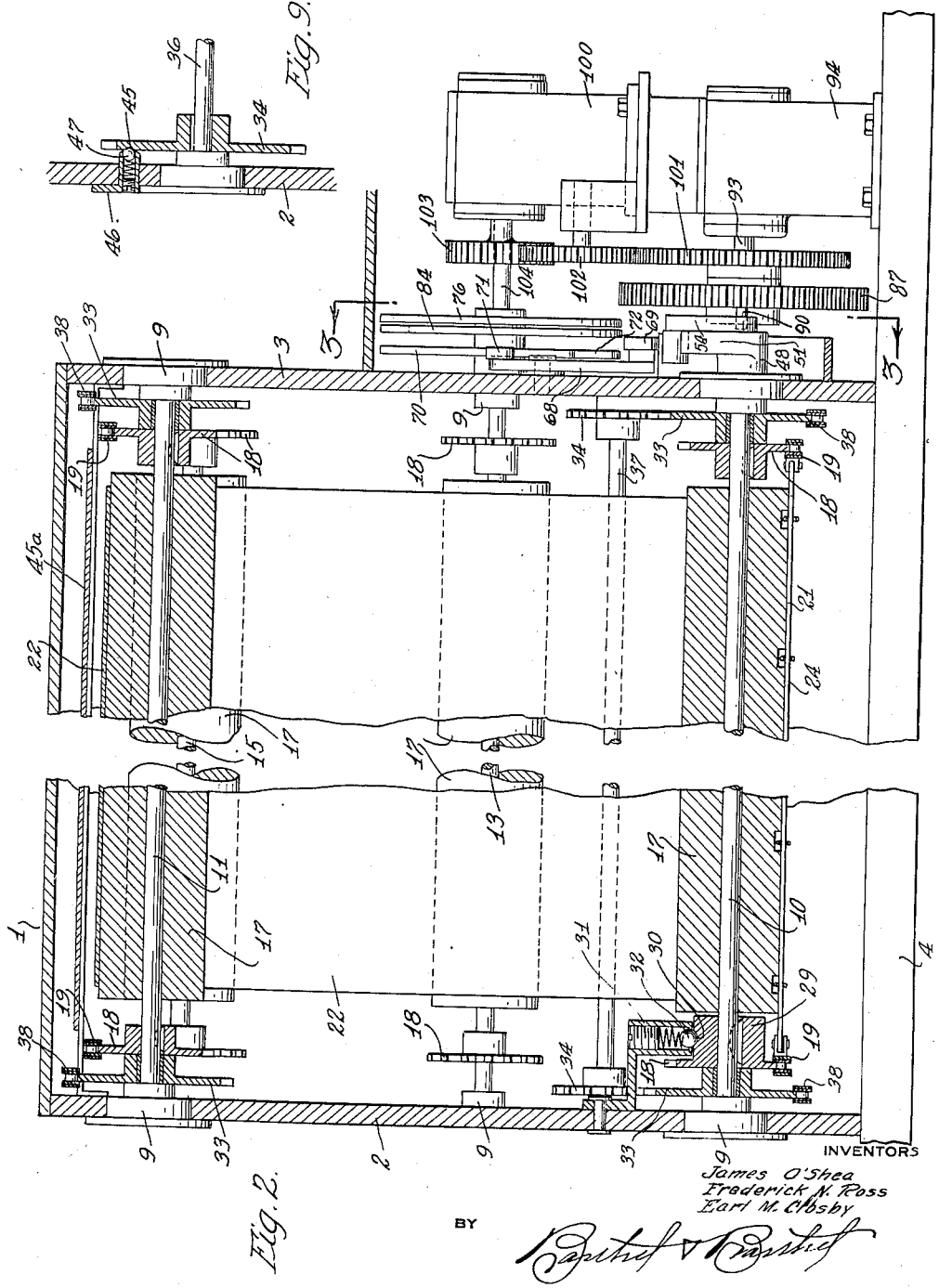

Nov. 10, 1936.　　　　J. O'SHEA ET AL　　　2,060,341
DISPLAY DEVICE
Filed Feb. 4, 1935　　　　4 Sheets—Sheet 4
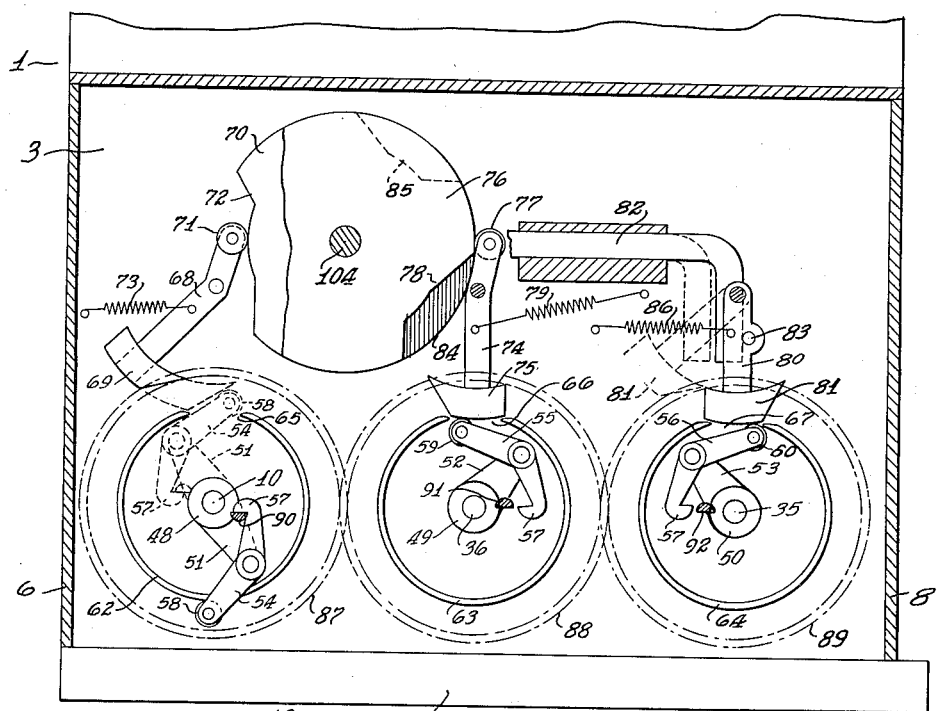
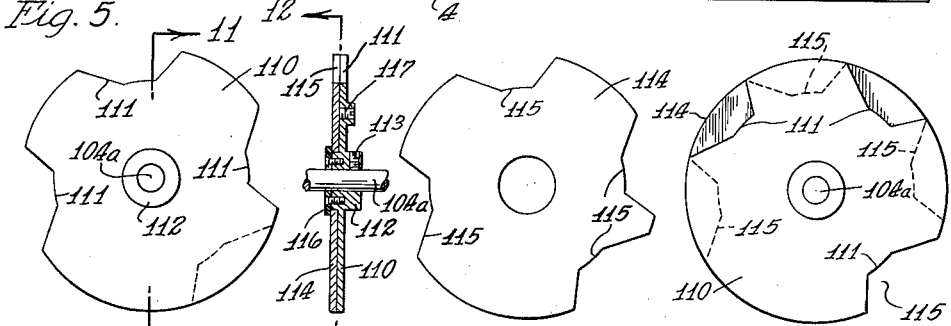
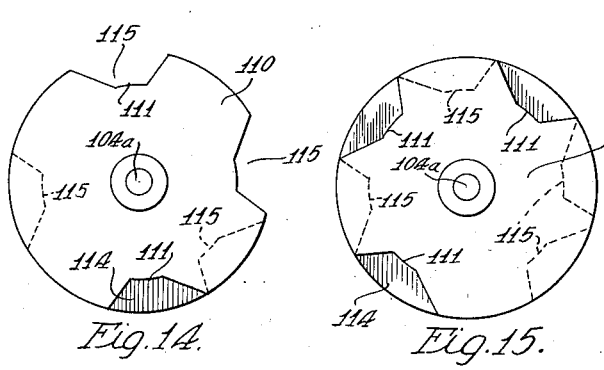
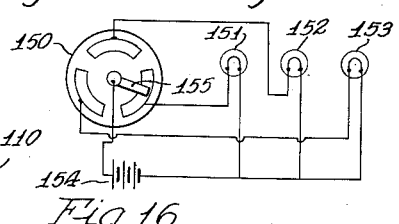
INVENTORS
James O'Shea
Frederick N. Ross
Earl M. Crosby
BY
ATTORNEYS Patented Nov. 10, 1936

2,060,341

UNITED STATES PATENT OFFICE 2,060,341

DISPLAY DEVICE

James O'Shea, Detroit, Frederick N. Ross, Grosse Pointe Park, and Earl M. Crosby, Royal Oak, Mich.; said Ross and said Crosby assignors to said O'Shea Application February 4, 1935, Serial No. 4,888

23 Claims. (Cl. 40—32)

The present invention relates to a novel advertisement displaying apparatus wherein display panels are exposed to view through an opening in a cabinet or housing for containing the apparatus, and more particularly to improvements relating to devices as disclosed in Patent No. 1,842,422 issued January 26, 1932.

The primary object of the present invention is to provide means for consecutively displaying a series of advertising panels through an opening in a housing for containing the panels, the said means being constructed so as to hold the panels stationary for a given period of time when one of the panels has been moved to a position directly opposite to the opening in the housing. In combination with the means for moving, positioning and holding the panels stationary the invention provides a curtain for covering the opening and means for actuating the curtain in timed relationship with the movement of the panels so that the curtain may be moved to and held stationary in a position covering the opening while one panel is being removed from opposite the opening and another panel being moved to a position opposite the opening. The curtain may also bear advertising material or it may be left blank, as desired.

Another important object of the present invention is to provide, in a display device wherein a series of display panels are to be consecutively moved opposite to an opening in an enclosing housing, positive actuating means for moving the means which supports the advertising panels the proper distance to carry one panel from its position opposite the opening and to properly position another panel opposite to the opening, at which time the actuating means causes the panel conveying means to remain stationary for a predetermined period of time. Co-operating with the panel conveying actuating means is a curtain actuating means which functions in timed relationship thereto, the curtain actuating means being positive and sure in its operation and functioning to move the curtain over the opening while the panels are being moved and to hold the curtain away from the opening during the time interval wherein the panels are stationary. In connection with these two actuating means it is a further object of the invention to provide for variations in the time intervals provided for each operation and the means for providing such variations is shown by way of modification as comprising an adjustable cam to take the place of the master cam for controlling the consecutive movements of the panel and curtain actuating means. That is to say, by adjusting the cam, through the means providing for such adjustment, the time intervals between panel operations may be varied and the time intervals between curtain operations may be likewise varied or the curtain may be caused to remain inoperative in either its position where it covers the opening or in its position away from the opening. The cam may also be adjusted to cause curtain operation simultaneously with the panel operation or so that the curtain movement takes place partly during movement of the panels and partly while the panels are stationary, or the panel conveyor may be caused to remain inoperative.

Still another object of the present invention is to provide an intermittently operating clutch mechanism for intermittently moving panel and curtain conveying means in an advertisement displaying device.

Another important object of the invention is to provide an elastic means for mounting advertising panels on conveying means in a display device, the said means providing for the independent mounting of different panels whereby certain panels may be changed without disturbing the other panels, the elasticity of the said means functioning to maintain the panels in a taut condition to eliminate possibility of shrinkage or elongation, resulting from temperature changes and weather conditions, causing damage to the panels through wrinkling, etc.

With the above ends in view, and others which will become apparent as the description progresses, the invention is described with reference to the accompanying drawings, in which Figure 1 is a vertical transverse cross section of the housing and means for supporting the panels;

Fig. 2 is a cross section taken along the line 2—2 of Fig. 1;

Fig. 5 is a companion view to Fig. 3 illustrating another stage of operation;

Fig. 6 is a cross section of a detail;

Fig. 7 is a cross section taken on the line 7—7 of Fig. 6;

Fig. 8 is a perspective view of a detail;

Fig. 9 is a cross section of a detail;

Fig. 10 is an elevation of a modified master cam construction;

Fig. 11 is a cross section taken on line 11—11 of Fig. 10;

Fig. 12 is a cross section taken on line 12—12 of Fig. 11;

Figs. 13, 14 and 15 are elevations of the cam illustrating different positions of adjustment thereof, and Fig. 16 is a diagrammatic view of a lamp circuit.

Like characters of reference are employed throughout to designate corresponding parts.

Figure 3:
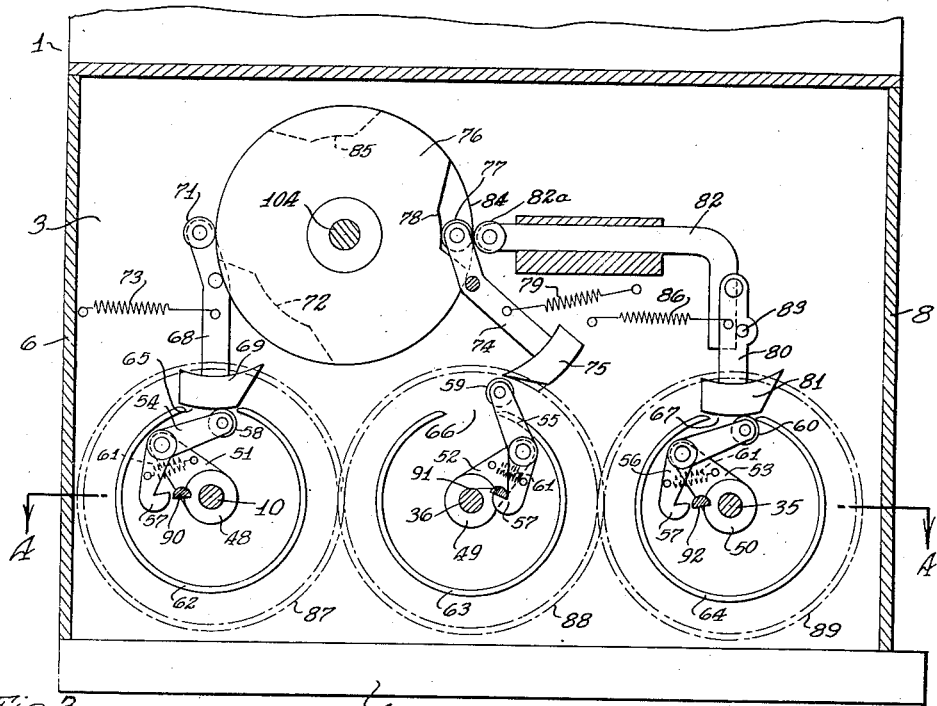
Fig. 3 is a cross section taken on the line 3—3 of Fig. 2.
Figure 4:
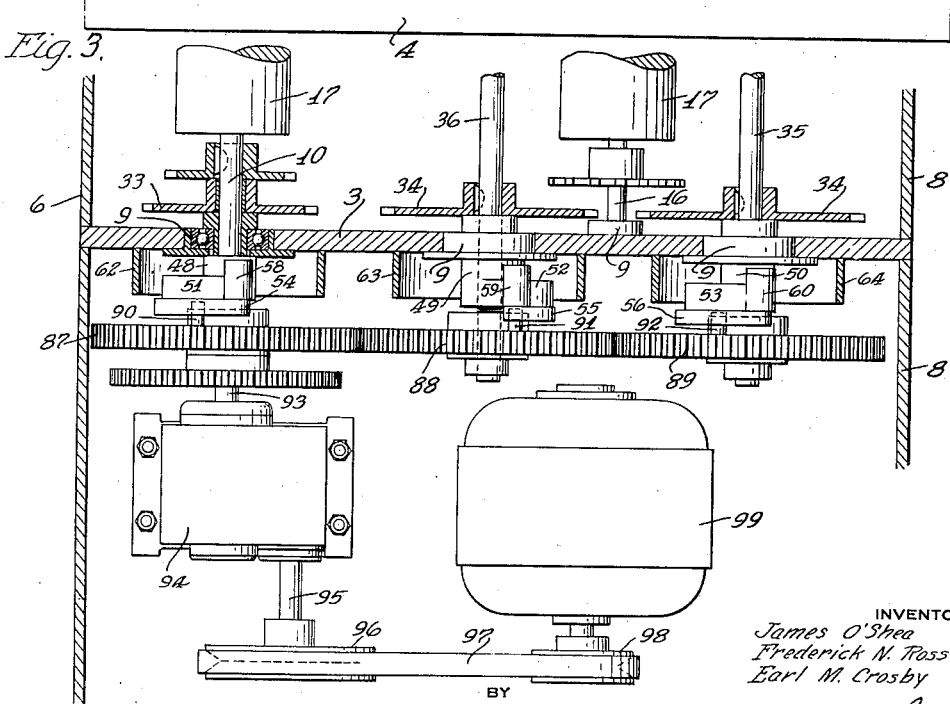
Fig. 4 is a cross section taken on line 4—4 of Fig. 3.

The present device includes a housing 1 comprised of vertically extending transverse walls 2 and 3, a base 4, a front wall 5 having an opening 6 therein, a cover 7 and a removable rear wall 8 providing accessibility to the housing so that the panels and mechanism to be described may be changed, adjusted or repaired. Rotatably journaled in anti-friction bearings 9 in the walls 2 and 3 are shafts 10, 11, 12, 13, 14, 15 and 16 and secured on each of these shafts is a roller 17, the rollers being secured in any suitable manner so as to be non-rotative relative to their respective shafts. Each shaft 10, 11, 12, 13, 14, 15 and 16 has a pair of sprockets 18 keyed thereon, the sprockets being spaced apart on their respective shafts so that one sprocket is disposed adjacent to each wall 2 and 3. The sprockets are thus arranged in two sets and over each set of sprockets is trained an endless chain 19, the two chains 19 being supported by the sprockets and shafts 10 to 16 so that they follow parallel sinuous paths through the housing 1 when the shafts and sprockets are caused to rotate in a manner to be described.

Secured at regular spaced apart intervals on the chains 19 are U-shaped brackets 20 receiving and securing the ends of bars 21 relative to the chains 19. That is to say, the brackets 20 on opposite chains 19 connect the ends of the bars 21 to their respective chains so that the bars extend from one chain to the other. Flexible advertisement bearing panels 22 are reinforced at opposite ends by metal strips 23. One of the reinforcing members 23 on each panel is removably secured to a bar 21 by clips 24. The other reinforcing strip 23 on each panel is removably connected by a clip 25 to an elastic element 26. The other end of each elastic element 26 is removably connected to a transverse bar 21 by clips 27. The clips 24, 25 and 27 are loosely received in their respective parts 23—21, 23 and 21 so that the panels 22 may be readily disconnected from their supporting bars 21 and the elastic elements 26 may be removed and replaced. Through this construction, above described, the panels 22 are assembled on the chains 19 so as to move over the rollers 17 as the shafts and sprockets are rotated and because of the disposition of shafts 10 and 11 the panels will be consecutively moved past the opening 6. Each of the rollers 17 is notched as at 28 to accommodate the passage of the bars 21, reinforcing strips 23 and clips 24, 25 and 27 over the rollers 17 without buckling or unduly sharp bending of the panels.

One of the sprockets 18, preferably on the shaft 10 is provided with an enlarged hub 29 formed with a recess 30. Secured to the wall 2 is a bracket 31 supporting a spring pressed ball 32 in a position whereby it will enter the recess 30 at a certain stage of rotation of shaft 10.

Loosely journalled adjacent to each end of the shafts 10, 11 and 12 are sprockets 33 which cooperate with sprockets 34 on shafts 35, 36 and 37 to support two endless chains 38. Secured to the chains 28 in a manner similar to the transverse bars 21 are spaced apart transverse bars 39 and 40. One end of a flexible curtain 41 is secured to the bar 39 and its other end is attached by clips 42 to one end of an elastic element 43, the other end of each elastic element being connected to the transverse bar 40 by removable clips 44. The curtain 41 is thus supported by the chains 38 and sprockets 41 on the shafts 10 and 11 so that it may be moved, by rotation of sprockets 33 and 34, into a position between the panels 22 and the opening 6. Above the shafts 11 and 12 is provided a support 45ª to prevent sagging of the curtain 41 when the latter is moved by the chains 38 away from its position opposite the opening 6 to a position above the opening by mechanism that will be described.

As shown in Fig. 9 one of the sprockets 34 which is keyed on shaft 36 has a recess 45 in the face thereof. Supported in a bracket 46 in the wall 2 is a spring pressed ball 47 which is adapted to enter the recess 45 at one stage of rotation of the shaft 36.

Each of the shafts 10, 36 and 35 extends through the wall 3 and secured to these shafts to rotate therewith are collars 48, 49 and 50 respectively. Extending radially from the collars are arms 51, 52 and 53 pivotally supporting rocking levers 54, 55 and 56. One end of each rocking lever is formed with a hook 57 and the other ends support rollers 58, 59 and 60 respectively. Springs 61 are attached to the rocking levers 54, 55 and 56 and to their respective supporting arms to normally urge pivotal movement of the rocking levers.

Secured to the wall 3 concentric with the shafts 10, 36 and 35, respectively, are cams 62, 63 and 64. The cams 62, 63 and 64 when viewed in elevation, as in Figs. 3 and 5, are in the form of an interrupted annulus. In other words the cams 62, 63 and 64 are comprised of annularly shaped elements whose terminals are spaced apart to provide gaps 65, 66 and 67 so that both the inner and outer surfaces thereof serve as cam surfaces as will hereinafter appear. The rollers 58, 59 and 60 are supported by their respective levers in a position to cooperate with the cams 62, 63 and 64 respectively.

Pivotally supported above the cam 62 is a lever 68 carrying a shoe 69 which is normally held in a position closing the gap 65 by engagement of a plate cam 70 with a roller 71. The plate cam 70 has a notch 72 which the roller 71 is adapted to enter as a result of the urge of a spring 73.

Pivotally mounted above the cam 63 is a lever 74 carrying a shoe 75 adapted to close the gap 66. The lever 74 is pivotally moved to a position where the shoe 75 closes the gap 66 by a plate cam 76 which engages a roller 77 on the end thereof. In the cam 76 is a notch 78 which the roller 77 is adapted to enter as a result of the urge of a spring 79 to cause pivotal movement of the lever 71 to remove the shoe 75 from the gap 66.

Pivotally mounted above the cam 64 is a lever 80 carrying a shoe 81 adapted to close the gap 67. The lever 80 is held in a position where the shoe 81 closes the gap 67 by engagement of a push rod 82 with a pin 83 on the lever 80. The push rod 82 is in turn held by engagement of a roller 83 thereon with a plate cam 84. The plate cam 84 has a notch 85 which the roller 83 is adapted to enter as a result of the urge of a spring 86 on lever 80 whereby the latter pivots to carry the shoe 81 away from the gap 67.

Co-axial with the shafts 10, 36 and 35 are gear wheels 87, 88 and 89, these gears being independently rotatable relative to the shafts 10, 36 and 35 and being in intermeshing relationship, one with another. The gear wheels carry pins 90, 91 and 92 projecting laterally therefrom into co-operative relationship with the rocking levers 54, 55 and 56 respectively. The gear wheel 89 is driven by a shaft 93 forming a part of a speed reduction gear mechanism in a casing 94 and operated through shaft 95, pulley 96, belt 97, pulley 98 and motor 99.

Supported upon the top of the speed reduction gear mechanism casing 94 is another speed reduction mechanism casing 100 operated from shaft 93 by gears 94, 95 and 96. The take off shaft 104 from the casing 100 has its free end supported by the wall 3 and the above described plate cams 70, 76 and 84 are supported on the shaft 104 to rotate therewith.

When the motor 99 is operating it causes the gear wheels 87, 88 and 89 to constantly rotate and at the same time the gear train comprised of gears 101, 102 and 103, connected with the shaft 93 which drives the gear wheel 87, causes the shaft 104 and plate cams 70, 76 and 84 to constantly rotate also. The speed reduction mechanism in the casing 100 causes the shaft 104 to rotate at a slower rate of speed than the shaft 93.

With the curtain and panels in the position shown in Fig. 1 which corresponds with Fig. 5, the driving mechanism has moved the curtain or shutter 41 to a position where it obstructs the opening 6. The device is then ready for the next step in the functioning of the mechanism, which is the movement of the advertisement bearing panels 22. This next step occurs when the shaft 104 has been rotated to a position aligning the notch 72 in cam plate 70 with the roller 71 at which time the spring 73 causes the lever 68 to pivot and the latter carries the shoe 69 away from the gap 65 and permits rocking lever 54 to rock, as a result of the urge of its associated spring 61, whereby the roller 58 moves outwardly and passes through the gap 65, causing the hooked end 57 thereon to move inwardly and into the path of pin 90. The pin 90, it will be understood, is carried in a circular orbit by the constantly rotating gear wheel 87 and it engages the hook on the rocking lever 54 as the latter is moved inwardly. A driving connection is thus established between the gear 87 and the collar 48 on the shaft 10 whereby the latter is caused to rotate. The sprockets 18 on shaft 10 set the chains 19 in motion and, as above pointed out, the panels 22 are moved with the chains. The notch 72 is proportioned so that the lever 68 remains in its pivoted position until the gear 87 and shaft 10 have made two complete revolutions, at which time it moves the lever 68, due to contact of the plate cam 70 with the roller 71, until the shoe 69 is in the partly pivoted position illustrated in broken lines in Fig. 5. At this time the shoe 69 is in the path of movement of the roller 58 around the cam 62 and it acts to guide the roller 58 inwardly through the gap 65 and into contact with the inner surface of the cam 62, and the inward movement of roller 58 rocks the lever 54 and moves the hooked end 57 on a lever 54 out of engagement with the pin 90. The driving connection between gear wheel 87 and shaft 10 is thus broken and simultaneously with the breaking of the driving connection the ball check 32 enters the notch 30 and checks rotation of shaft 10.

The check 32 serves as an indexing means for the panels 22 inasmuch as it is arranged so that it functions when a panel 22 is disposed directly opposite to the opening 6, and when the shaft 10 and collar 48 are positioned to hold the roller 58 in alignment with the gap 65. During the operation just described the rocking levers 55 and 56 are held in a position where their hooked ends 57 are out of the paths or orbits of pins 91 and 92 by their respective cams 63 and 64.

Shortly after the completion of the above described operation the cam plate 84 will have been rotated by shaft 104, to a position where the notch 85 is in alignment with the roller 83, at which time the push rod 82 is permitted to slide longitudinally to allow the lever 80 to pivot as a result of the urge of spring 86. The shoe 81 is moved away from the gap 67 by pivotal movement of lever 80 and rocking lever 56 is rocked by its spring 61 to move the roller 60 outwardly through the gap 67 and its hooked end 57 inwardly and into the path of movement of the pin 92. A driving connection is thus established between the gear wheel 89 and the shaft 35, causing the sprockets 34 to rotate to move the chains 38 to carry the curtain 41 away from the opening 6. At the completion of one revolution of shaft 35 the shoe 81 will have been moved, through its connection with cam plate 84, until it guides the roller 60 inwardly and rocks the lever 56 to move its hooked end out of engagement with the pin 92. The driving connection between shaft 35 and gear wheel 89 is then broken and simultaneously with this function the ball check 47 engages the recess 45 to stop rotation of sprocket 34 on shaft. 36 to prevent further movement of chains 38. At this time the curtain 41 will have been moved away from the opening 6.

Shortly after the completion of the second described operation the cam 76 is moved by shaft 104 so that roller 77 may enter notch 78 and lever 74 pivots as a result of the pressure spring 79. Pivotal movement of lever 74 moves shoe 75 away from the gap 66 to the position illustrated in Fig. 3. Rocking lever 55 then rocks to move roller 59 through the gap 66 and hooked end 57 into the path of movement of pin 91 so that the latter engages the same and connects the shaft 36 with the gear wheel 88. Inasmuch as rotation of the gear 88 is opposite to that of gear 89 rotation of shaft 36 and its sprockets 34 is also in a reverse direction and causes a reverse movement of chains 38 which carry the curtain 41 back to the position illustrated in Fig. 1. After one complete revolution of shaft 36 shoe 75 is moved, through its connection with cam plate 76, to a position where it guides the roller 59 inwardly and in so doing rocks lever 55 so that its hooked end 57 is moved out of engagement with the pin 92. At the time the driving connection is broken in this manner the check 47 will again function to stop further movement of shaft 36 and chains 38.

From the foregoing description it becomes apparent that the driving mechanism functions to successively move the panels 22 to a position opposite to the opening 6 and to hold them stationary for predetermined time intervals. During movement of the panels the mechanism holds the curtain 41 over the opening 6, removes it after completion of the movement of the panels, and moves it back to again cover the opening just prior to the next successive movement of the panels. These several operations must be definitely timed relative to each other and in the embodiment disclosed and described the function of the driving mechanism is such as to provide absolute and definite timing. It is obvious, however, that the entire cycle of operation may be accelerated or decelerated by varying the rate of speed of operation of the motor 99. It is also obvious, in view of the present disclosure that the rate of movement of the cams 70, 76 and 84 relative to the rate of movement of gears 87, 88 and 89 may be varied by employing different gear ratios in the place of gears 101, 102 and 103 with the result that the time intervals between the successive operations above described may be varied.

It is apparent from the above description that the rate of movement of shaft 104 has a definite ratio relative to the rate of movement of the gears 87, 88 and 89 due to the fact that the said shaft and gears are geared together. In order to change the time intervals between the successive operations without disturbing this ratio the invention provides an adjustable cam which is shown by way of modification in Figs. 10 to 15 inclusive. It will be understood that the adjustable cam to be described comprises an individual cam to take the place of the cam plates 70, 76 and 84. That is to say, one of the modified cams is substituted for each of the cams 70, 76 and 84 and the function of the machine is unchanged with the exception that it may be caused to function more often with each rotation of shaft 104.

The modified cam comprises a plate 110 having three notches 111 in the periphery thereof and having a hub part 112 receiving a shaft 104a and a set screw 113 for securing it relative to the shaft. A plate 114 having four notches 115 in its periphery is rotatably held in contact with the plate 110 by an annular holding member 116. A set screw 117 is mounted in the plate 110 for engagement with the plate 114 to prevent relative rotation of the plates. By loosening the set screw 117 the plates may be relatively rotated to provide three depressions in the periphery of the cam as shown in Fig. 10, one depression as in Fig. 13, two depressions as in Fig. 14, or no depressions as in Fig. 15.

With reference to Fig. 1 the numeral 120 indicates the supply lines leading to the motor 99 and a main switch 121 for controlling the supply to the motor. A relay operated switch 122 is also provided in the motor supply and is adapted to be opened by closing of either of the switches 123 or 124. The switches 123 and 124 are urged toward their closed position by springs 125 and are normally held open by engagement of rollers 126 and 127 with the chains 19 and 38 respectively. It is obvious from the disclosure that in the event that either of the chains 19 or 38 should break the relay 122 will be operated to break the supply circuit to the motor 99 and the operation of the device will be stopped before the advertising panels or any other parts of the mechanism suffer damages.

In Fig. 1 the numeral 131 indicates an incandescent lamp or lamps provided in a circuit controlled by switches 128 and 129. The switches 129 are normally urged to an open position by springs and are adapted to be moved to a closed position by an element 130 carried by the curtain 41. As shown the curtain 41 is lowered and in this position the element 130 is holding the switch 129 closed. As the curtain is raised the element 130 will be moved away from the switch 129 and its spring will cause it to open to break the lamp circuit. When the curtain completes its upward travel the element 130 will close the switch 128 and again close the lamp circuit.

The device as above described may be adjusted to provide for movement of the curtain in only one direction. If such a function is desired one of the adjustable cams 110—114 is substituted in the place of cam 76, the adjustable cam being adjusted to the position shown in Fig. 15 so as to present no notches which the roller 77 can enter. The lever 74 is thus continuously held in a position closing the gap 66 and the hooked end 57 on rocking lever 55 cannot engage the pin 91. Each time the disk 84 is rotated to align a notch with the roller 82a the clutch associated therewith operates to rotate the sprocket 34 and shaft 35 to move the curtain with the chains 38. In order to guide the curtain around shafts 10 and 35 guide plates 45b and 45c are provided and in order to prevent interference between the curtains 41 and panels 22, the chain 38, instead of being trained over the sprockets 34 on shafts 37, are extended directly, as at 38a, from the sprockets 34 on shaft 36 to the sprockets 33 on shaft 10.

The effectiveness of the device as an advertising means may be enhanced by the provision of vari-colored lamps. An example of how such lamps may be incorporated is illustrated in Fig. 16 wherein there is shown a rotary type switch 150 for intermittently and successively connecting vari-colored lamps 151, 152 and 153 to a source 154 of electrical energy. The movable contactor 155, common to such switches, will be connected in any suitable manner, not shown, to a moving part in the device, such as the shaft 104 which operates the timing disks. Obviously any number of different colored lamps may be caused to be intermittently and successively illuminated in this manner.

Although specific embodiments are shown and described it will be understood that various changes may be made in the details of construction without departing from the scope of the appended claims, and such changes are contemplated.

What we claim is:—

1. In a display device, a housing having an opening therein, a plurality of display panels, means for successively moving said panels opposite said opening, yieldable means opposing movement of said first named means when a panel is opposite said opening for holding said panels stationary when one is positioned opposite said opening for a predetermined time interval, a curtain, and means for moving said curtain in timed relation to said panels to cause said curtain to obstruct said opening during movement of said panels and to remove said curtain from said opening when said panels are stationary.

2. In a display device comprising a housing having an opening therein, curtain conveying means in said housing, display panel conveying means in said housing, and a driving mechanism for selectively operating both said conveying means, said driving mechanism including means for holding said panel conveying means stationary during movement of said curtain conveying means and for holding the latter stationary during movement of the former, and means for adjusting said last named means for regulating the timed relationship of movements.

3. In a display device comprising a housing having an opening therein, curtain conveying means in said housing, panel conveying means in said housing, and a driving mechanism for selectively operating both said conveying means, said driving mechanism comprising clutches associated with each of said conveying means, means for causing engagement of said clutches in timed relationship, and adjustable means for varying said timed relationship.

4. In a display device comprising a housing having an opening therein, curtain conveying means in said housing, display panel conveying means in said housing, and a driving mechanism for selectively operating both said conveying means, said driving mechanism comprising a clutch connected to said curtain conveying means, a clutch connected to said panel conveying means, and means for causing selective and intermittent engagement of said clutches.

5. In a display device comprising a housing having an opening therein, curtain conveying means in said housing, display panel conveying means in said housing, and a driving mechanism for selectively operating both said conveying means, said driving mechanism comprising a power element, a clutch adapted to connect said curtain conveying means to said power element, a clutch adapted to connect said panel conveying means to said power element to move said means in one direction, a clutch for connecting said curtain conveying means with said power element to cause movement of said means in the opposite direction, and means for selectively operating said clutches in timed relation.

6. In a display device, a housing having an opening, conveying means in said housing for supporting a plurality of display panels, conveying means in said housing for supporting a curtain, means for moving said first named conveying means to successively position panels opposite said opening and for causing said conveying means to remain stationary for a definitely timed interval when a panel is opposite said opening, and means for moving said curtain conveying means in timed relation to said panel conveying means to position the curtain opposite said opening while said panel conveying means is being moved and to remove the curtain from said opening when said panel conveying means is stationary.

7. In a display device comprised of a pair of spaced apart conveyor members and means for intermittently moving the same, a plurality of advertisement bearing means, and means for securing said advertisement bearing means to said conveyor members, said means comprising rigid elements extending transversely between the conveyor members and having their ends attached to opposite conveyor members at equally spaced points, and elastic means connected to said advertisement bearing means and having their opposite ends connected to said rigid elements.

8. In a display device comprised of a pair of spaced apart conveyor members and means for intermittently moving the same, a plurality of display panels, and means for securing said panels to said conveyor members, said means comprising rigid elements extending transversely between the conveyor members and having their ends attached to opposite conveyor members, elastic elements attached to said rigid elements, and removable clips for connecting said elastic elements to said panels.

9. In a display device comprised of a pair of spaced apart conveyor members and means for intermittently moving the same, a plurality of display panels, and means for securing said panels to said conveyor members, said means comprising rigid elements extending transversely between the conveyor members and having their ends attached to opposite conveyor members, elastic elements, and removable elements for connecting said elastic elements to said rigid elements and panels.

10. In a display device, endless conveyors, means for supporting and moving said conveyors, a plurality of panels, means extending between said conveyors for attaching said panels to said conveyors, rollers for supporting said panels as they move with said conveyors, and recesses in said rollers for the reception of said means extending between said conveyors.

11. In a display device comprised of movable conveyors and a plurality of panels mounted thereon, a driving motor, means for connecting said motor to said conveyors to intermittently move the same, and means rendered operative by breaking of said conveyors for rendering the device inoperative.

12. In a display device, curtain conveying means, display panel conveying means, a power transmitting mechanism for operating said curtain and said panel conveying means, a motor for operating said power transmitting means, and means for rendering said device inoperative, said last named means being caused to function by breakage of either of said conveyor means.

13. In a display device wherein panels are supported to be exposed through an opening therein, a curtain, means for intermittently moving said curtain to cover said opening, a lamp circuit including a switch, and means operated by movement of said curtain for operating said switch.

14. In a display device wherein panels are supported to be exposed through an opening therein, a curtain, means for intermittently moving said curtain to cover said opening, and a lamp circuit including a switch adapted to be operated by movement of said curtain.

15. In a display device, a housing having an opening therein, display panels, means for moving said panels and for successively positioning them opposite said opening for predetermined time intervals, a curtain, means operating in timed relationship to said panel moving means for moving said curtain into and out of a position where it obstructs said opening, and a lamp circuit having a control switch operating in timed relation to both of said means.

16. In a display device, a housing having an opening therein, curtain conveying means in said housing, display panel conveying means in said housing, a driving mechanism including means for successively moving and holding said curtain conveying means and means for successively moving and holding said panel conveying means, and means for controlling said driving mechanism whereby to provide a predetermined inter-related sequence of operations of said curtain and panel conveying means.

17. In a display device, a housing having an opening therein through which advertising mediums are adapted to be displayed, curtain conveying means having a curtain thereon and adapted by movement thereof to carry said curtain into and out of alignment with said opening, a clutch associated with said curtain conveying means, a power element, and means for causing engagement and disengagement of said clutch to connect said conveying means with and to disconnect it from said power element.

18. In a display device, a housing having an opening therein through which advertising mediums are adapted to be displayed, curtain conveying means having a curtain thereon and adapted by movement thereof to carry said curtain into and out of alignment with said opening, oppositely rotating power elements, and clutches for connecting said conveying means with said power elements.

19. In a display device, a housing having an opening therein, a sinuous conveyor, advertising panels carried by said conveyor and adapted to be successively positioned in front of said opening, a power element, a clutch adapted to connect said power element to said conveying means, and means for timing the operations of said clutch.

20. In a display device, a housing having an opening, display means, conveyor means supporting said display means and adapted to move said display means to successively position them opposite said opening, means for driving said conveyor means, means for rendering said driving means inoperative for a predetermined time interval when a display means is opposite said opening, and means for opposing movement of said conveyor means when a display means is opposite said opening.

21. In a display device, a housing having an opening, display means, conveyor means supporting said display means and adapted to move said display means to successively position them opposite said opening, driving means for operating said conveyor means, means for rendering said driving means inoperative when a display means is moved into a position opposite said opening, means for rendering said driving means operative after a predetermined time interval, and adjustable means for varying said time interval.

22. In a display device, a housing having an opening, display means, conveyor means supporting said display means and adapted to be moved to successively position said display means opposite said opening, driving means for moving said conveyor means, means for intermittently rendering said driving means inoperative, and frictional means for arresting movement of said conveyor means when said driving means is rendered inoperative.

23. In a display device, a housing having an opening, display means, conveyor means supporting said display means and adapted to move said display means to successively position them opposite said opening, driving means for operating said conveyor means, means for rendering said driving means inoperative when said conveyor means has moved a display means into a position opposite said opening, means for rendering said driving means operative after a predetermined time interval, adjustable control means for said last two named means, and removable means for holding said adjustable control means in operative relationship with said last two named means, said removable means being adapted to permit movement of said control means to an inoperative position with respect to said last two named means whereby to cause continuous movement of said conveyor means.

JAMES O'SHEA.
FREDERICK N. ROSS.
EARL M. CROSBY.